(12) United States Patent
Swift et al.

(10) Patent No.: US 8,580,139 B2
(45) Date of Patent: Nov. 12, 2013

(54) DEDUSTING COMPOSITIONS AND METHODS FOR MAKING AND USING SAME

(75) Inventors: Brian L. Swift, Oxford, GA (US); Lisa M. Arthur, Conyers, GA (US); Kelly A. Shoemake, Atlanta, GA (US); Michael C. Peck, Snellville, GA (US); John B. Hines, Atlanta, GA (US); Pablo G. Dopico, Conyers, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 248 days.

(21) Appl. No.: 12/874,991

(22) Filed: Sep. 2, 2010

(65) Prior Publication Data

US 2011/0049417 A1 Mar. 3, 2011

Related U.S. Application Data

(63) Continuation-in-part of application No. 12/533,726, filed on Jul. 31, 2009, now Pat. No. 8,133,408.

(60) Provisional application No. 61/085,840, filed on Aug. 2, 2008, provisional application No. 61/239,161, filed on Sep. 2, 2009.

(51) Int. Cl.
*C09K 3/22* (2006.01)
(52) U.S. Cl.
USPC ............................ 252/88.1; 252/88.2
(58) Field of Classification Search
USPC ............................................. 252/88.1
See application file for complete search history.

(56) References Cited

U.S. PATENT DOCUMENTS

| | | | |
|---|---|---|---|
| 2,238,776 A | 4/1941 | Kleinicke | |
| 3,563,792 A | 2/1971 | Deuzeman | |
| 3,702,798 A | 11/1972 | Shannon | |
| 3,943,117 A | 3/1976 | Force | |
| 3,954,662 A | 5/1976 | Salyer et al. | |
| 3,961,752 A | 6/1976 | Doeksen | |
| 4,075,188 A | 2/1978 | Vardell, Jr. | |
| 4,154,725 A | 5/1979 | Otrhalek et al. | |
| 4,171,276 A | 10/1979 | Brehm | |
| 4,238,304 A | 12/1980 | Zucker | |
| 4,308,200 A | 12/1981 | Fremont | |
| 4,417,992 A * | 11/1983 | Bhattacharyya et al. | 252/88.1 |
| 4,476,276 A | 10/1984 | Gasper | |
| 4,495,095 A | 1/1985 | Lawson et al. | |
| 4,524,024 A | 6/1985 | Hughes | |
| 4,551,261 A | 11/1985 | Salihar | |
| 4,594,268 A | 6/1986 | Kirwin | |
| 4,650,598 A | 3/1987 | Roberts et al. | |
| 4,795,764 A | 1/1989 | Alm et al. | |
| 4,801,635 A | 1/1989 | Zinkan et al. | |
| 4,822,425 A | 4/1989 | Burch et al. | |
| 4,913,585 A | 4/1990 | Thompson et al. | |
| 4,971,720 A | 11/1990 | Roe | |
| 5,079,036 A | 1/1992 | Roe et al. | |
| 5,124,363 A | 6/1992 | Stern | |
| 5,132,399 A | 7/1992 | MacDonald | |
| 5,143,645 A | 9/1992 | Roe | |
| 5,164,480 A | 11/1992 | Huibers et al. | |
| 5,194,174 A | 3/1993 | Roe et al. | |
| 5,310,494 A | 5/1994 | Bennett | |
| 5,350,596 A | 9/1994 | Walker, Jr. | |
| 5,352,297 A | 10/1994 | Peters | |
| 5,409,626 A | 4/1995 | Muth | |
| 5,441,566 A | 8/1995 | Vaughan | |
| 5,480,584 A | 1/1996 | Urano et al. | |
| 5,527,482 A | 6/1996 | Pullen et al. | |
| 5,536,429 A | 7/1996 | Bennett et al. | |
| 5,578,239 A | 11/1996 | Bennett | |
| 5,670,571 A | 9/1997 | Gabrielson et al. | |
| 5,895,347 A | 4/1999 | Doyle | |
| 5,958,287 A | 9/1999 | Pullen | |
| 6,124,366 A | 9/2000 | Pullen et al. | |
| 6,355,083 B1 * | 3/2002 | Ogzewalla | 71/33 |
| 6,469,125 B1 | 10/2002 | Fontana et al. | |
| 6,589,442 B1 | 7/2003 | Wilson et al. | |
| 6,906,130 B2 | 6/2005 | Tutin et al. | |
| 7,108,800 B2 | 9/2006 | Tran et al. | |
| 7,398,935 B2 | 7/2008 | Tran et al. | |
| 7,842,382 B2 | 11/2010 | Helbing | |
| 2005/0268530 A1 | 12/2005 | Brewer et al. | |
| 2008/0064284 A1 | 3/2008 | Srinivasan et al. | |
| 2008/0064799 A1 | 3/2008 | Srinivasan et al. | |
| 2008/0179570 A1 | 7/2008 | Hurd et al. | |
| 2008/0194795 A1 | 8/2008 | Hurd et al. | |
| 2008/0280787 A1 | 11/2008 | Rediger et al. | |
| 2009/0065736 A1 | 3/2009 | Johnson et al. | |
| 2009/0194731 A1 | 8/2009 | Hurd et al. | |
| 2009/0301972 A1 | 12/2009 | Hines et al. | |
| 2010/0025625 A1 | 2/2010 | Swift et al. | |

FOREIGN PATENT DOCUMENTS

| | | |
|---|---|---|
| GB | 1302001 | 1/1973 |
| JP | 2008/0222802 | 9/2008 |
| NZ | 521650 | 5/2005 |
| WO | 96/00199 A1 | 1/1996 |
| WO | 2005/121272 A1 | 12/2005 |

* cited by examiner

*Primary Examiner* — Necholus Ogden, Jr.
(74) *Attorney, Agent, or Firm* — Ram W. Sabris

(57) ABSTRACT

Compositions for reducing the formation of dust and methods for making and using same are provided. The composition can include an emulsion comprising one or more pitches, one or more fatty acids, one or more rosins, or any combination thereof. The composition can also include one or more film forming polymers, one or more oils, or a combination thereof.

20 Claims, No Drawings

DEDUSTING COMPOSITIONS AND METHODS FOR MAKING AND USING SAME

CROSS-REFERENCE TO RELATED APPLICATIONS

This application is a continuation-in-part of U.S. patent application Ser. No. 12/533,726, filed Jul. 31, 2009 (U.S. Publication No. 2010/0025625), which claims priority to U.S. Provisional Patent Application Ser. No. 61/085,840, filed Aug. 2, 2008. This application also claims priority to U.S. Provisional Patent Application Ser. No. 61/239,161, filed Sep. 2, 2009. All of which are incorporated in their entirety by reference herein.

BACKGROUND

1. Field

Embodiments described herein generally relate to dedusting compositions. More particularly, such embodiments relate to dedusting compositions for reducing dust.

2. Description of the Related Art

Open top railcars transporting coal lose anywhere from about 2 wt % to about 5 wt % of the coal load due to fugitive dust loss during transit. Not only does this loss of coal represent both an economic loss and an environmental contamination issue, particularly for rail lines adjacent populated areas, but the collection of coal dust on train tracks is also believed to contribute to train derailments. Thus, ways for reducing the erosion and loss of coal from railcars during transit has long been a focus in the industry.

Over the years, a variety of materials and/or methods have been used and/or considered for reducing the level of fugitive dust associated with the handling of coal. One method involves placing a cover over each rail car, but such an approach is both time consuming and expensive, making covers an uneconomical option. Another approach is to spray water onto the top of each rail car, but after a relatively short time this method becomes ineffective due to evaporation of the water and other factors. A third approach has been to spray a binder solution onto the top of each rail car, but this approach also has undesired results. For example, once the binder solutions dry a tacky layer develops. Overspray onto the sides of the rail cars is inevitable and the tackiness of the dried binder solutions cause an undesired buildup of dirt, dust, coal, and other material on the outside of the rail cars. This buildup must be removed and the frequent cleaning of the rail cars is time consuming, expensive, and, as such, uneconomical.

There is a need, therefore, for improved methods for reducing the formation of fugitive dust, such as from coal transported in open rail cars, while also reducing or eliminating buildup on the rail cars due to tackiness of the dried binder solution.

SUMMARY

Compositions for reducing the formation of dust and methods for making and using same are provided. In at least one specific embodiment, the composition can include an emulsion comprising one or more pitches, one or more fatty acids, one or more rosins, or any combination thereof. The composition can also include one or more film forming polymers, one or more oils, or a combination thereof.

In at least one specific embodiment, a method for reducing the formation of dust can include applying a composition to a dust forming material in an amount sufficient to reduce the formation of dust. The composition can include an emulsion comprising one or more pitches, one or more fatty acids, one or more rosins, or any combination thereof. The composition can also include one or more film forming polymers, one or more oils, or a combination thereof.

In at least one specific embodiment, a method for making a composition can include emulsifying one or more pitches, one or more fatty acids, one or more rosins, or any combination thereof to produce an emulsion; and combining the emulsion with one or more film forming polymers, one or more oils, or both to product the composition.

DETAILED DESCRIPTION

The composition or "dedusting composition" can include an emulsion and one or more film forming polymers and/or one or more oils. The emulsion can include one or more pitches, one or more fatty acids, one or more rosins, or any combination thereof. It has been surprisingly and unexpectedly discovered that the dedusting compositions provided herein can be applied to a substrate and at least partially dried to form a film or layer of reduced tackiness relative to an emulsion not containing a film forming polymer and/or oil. In at least one specific embodiment, the dedusting compositions provided herein can be applied to a substrate and at least partially dried to form a tack-free film, according to ASTM D1640-03.

Suitable pitches can include, but are not limited to, bio-based or bio-derived pitches, petroleum based or petroleum derived pitches, or a combination thereof. Illustrative bio-based pitches can include, but are not limited to, tall oil pitch, crude tall oil, natural resins such as shellac, gilsonite, copal, lignin, and wood tar, or any combination thereof. Illustrative petroleum based pitches can include, but are not limited to, coal tar pitch, asphalts such as bitumen, heavy crude oil, heavy petroleum distillates, tar-like, low volatility Fischer-Tropsch products, or any combination thereof.

Tall oil pitch is derived from crude tall oil (CTO). Crude tall oil is recovered as a byproduct in the Kraft pulping process. According to this process, wood is digested with alkali and sulfide, producing tall oil soap and crude sulfate turpentine as by-products. Acidification of the tall oil soap produces crude tall oil. Prior to refining, crude tall oil can include a mixture of rosin or rosin acids, fatty acids, and neutral materials. As used herein, the term "neutral materials" refers to unsaponifiable material that typically includes sterols, higher-molecular weight alcohols and other alkyl chain materials. Crude tall oil is a known material of commerce. The CAS number for crude tall oil (CTO) is 8002-26-4

Crude tall oil can have a fatty acids concentration ranging from a low of about 15 wt %, about 20 wt %, or about 25 wt % to a high of about 50 wt %, about 60 wt %, or about 70 wt %. Crude tall oil can have a rosin concentration ranging from a low of about 15 wt %, about 20 wt %, or about 25 wt % to a high of about 60 wt %, about 70 wt %, or about 75 wt %. Crude tall oil can have a neutral materials concentration ranging from a low of about 15 wt %, about 20 wt % or about 30 wt % to a high of about 35 wt %, about 40 wt %, or about 45 wt %. Illustrative fatty acids can include, but are not limited to, oleic acid, linoleic acid, conjugated linoleic acid, lauric acid, ricinoleic acid, stearic acid, palmitic acid, linolenic acid, palmitoleic acid, myristic acid, arachidic acid, behenic acid, and any combination thereof. Illustrative rosin acids or rosins can include abietic acid, dehydroabietic acid, isopimaric acid and pimaric acid.

Crude tall oil can have an acid value ranging from a low of about 100, about 110, or about 120 to a high of about 165, about 175, or about 180. The acid value can be determined by dissolving a known weight of the material into an organic solvent, e.g., toluene, and then titrating a measured amount of methanolic potassium hydroxide (KOH) solution into the material. The titration is complete when a pH of about 7 is obtained. The acid value of the material is equal to the amount of KOH, in milligrams, that was used in the titration, divided by the weight of the material, in grams, of the sample that was titrated. In other words, the acid value is equal to the milligrams of KOH needed to neutralize 1 gram of material.

Crude tall oil can have a specific gravity ranging from a low of about 0.9, about 0.95, or about 1 to a high of about 1.2, about 1.25, or about 1.3. Crude tall oil can have a saponification number ranging from a low of about 115, about 120, or about 125 to a high of about 175, about 180, or about 195. Crude tall oil can have an iodine number ranging from about 135, about 138, or about 140 to a high of about 148, about 150, or about 155. Crude tall oil can have a flash point ranging from a low of about 300° C., about 325° C., or about 350° C. to a high of about 375° C., about 400° C., or about 425° C.

The crude tall oil can be distilled to provide several different products in addition to tall oil pitch, which can include, but are not limited to, heads or lights, fatty acids or tall oil fatty acids (TOFA), distilled tall oil (DTO) (a mixture of fatty acids and resins), and rosin acids or rosin. Tall oil pitch is a known material of commerce. The CAS number for tall oil pitch is 8016-81-7. In one or more embodiments, the pitch can be or include tall oil pitch. In one or more embodiments, the tall oil pitch can be provided in the form of crude tall oil. In other words, the tall oil pitch can be used as present in crude tall oil. In one or more embodiments, the pitch can be a mixture, blend, or combination of tall oil pitch and crude tall oil.

The precise composition of tall oil pitch depends, at least in part, on the particular process by which the tall oil pitch is isolated and/or the particular source(s) of wood from which the crude tall oil is produced. At room temperature, tall oil pitch is a semi-solid, tar-like material. Tall oil pitch is a hydrophobic material. The tall oil pitch can include, but is not limited to, fatty acids, esters of fatty acids, rosin or rosin acids, esters of rosin acids, and neutral materials. The fatty acids, the rosin acids, or both can be chemically modified. For example, chemically modified rosins can retain some polar groups like carboxylic acid or a polar group that has been added like an amine (rosin amine), polyethylene glycol chain (as a non-ionic emulsifier) or additional acid functionality through a Diels Alder reaction with fumaric or maleic acid/anhydride. Accordingly, chemically modified rosins include disproportionated rosin acids, maleated rosin acids, diethylene tetramine amido amines of rosin acids, amine-modified rosin acids, rosin salts, rosin ethoxylates, phenolic modified rosins, dimerized rosins, rosin-formaldehyde adducts, hydrogenated rosin, or any combination thereof.

The tall oil pitch can have a concentration of fatty acids and esters of fatty acids ranging from a low of about 5 wt %, about 7 wt %, or about 9 wt % to a high of about 20 wt %, about 30 wt %, about 40 wt %, about 50 wt %, or about 55 wt %. The tall oil pitch can have a concentration of rosin acids and esters of rosin acids ranging from about 5 wt %, about 7 wt %, or about 9 wt % to a high of about 20 wt %, about 25 wt %, about 30 wt %, or about 35 wt %. The tall oil pitch can have a concentration of neutral materials ranging from a low of about 30 wt %, about 40 wt %, or about 50 wt % to a high of about 70 wt %, about 80 wt %, or about 90 wt %. Dimerized rosin and dimerized fatty acid also can also be found in tall oil pitch. The tall oil pitch can have a moisture or water content of less than about 1 wt %, less than about 0.5 wt %, less than about 0.1 wt %, or less than about 0.05 wt %.

The tall oil pitch can have an acid value ranging from a low of about 20, about 25, or about 30 to a high of about 40, about 45, or about 50. The tall oil pitch can have a viscosity (centipoise at 85° C.) ranging from a low of about 20 centipoise (cP), about 40 cP, or about 60 cP to a high of about 110 cP, about 130 cP, or about 150 cP. The tall oil pitch can have a density ranging from a low of about 900 g/L, about 910 g/L, or about 920 g/L to a high of about 940 g/L, about 950 g/L, or about 960 g/L. The tall oil pitch can have a softening temperature ranging from a low of about 15° C., about 20° C., or about 25° C. to a high of about 40° C., about 50° C., or about 60° C. The tall oil pitch can have an energy or heating value of about 10,000 BTU/lb, about 12,000 BTU/lb, about 14,000 BTU/lb, about 16,000 BTU/lb, about 18,000 BTU/lb, about 20,000 BTU/lb, about 22,000 BTU/lb, or about 25,000 BTU/lb.

Suitable tall oil pitches are commercially available from a variety of sources including Georgia-Pacific Chemicals LLC, e.g., XTOL® Tall Oil Pitch. Typical properties of XTOL® Tall Oil Pitch include a viscosity of about 450 cP at a temperature of 85° C., a concentration of rosin acids of about 9 wt %, a concentration of fatty acids of about 9 wt %, an acid value of 35 mg KOH/g, and an energy value of about 17,000 BTU/lb.

Another suitable pitch can include coal tar pitch, which is a byproduct of coke production and coal gasification. Coal tar pitch is a mixture containing polycyclic aromatic hydrocarbons and heterocyclic compounds. Another suitable pitch can include one or more asphalts (bitumens), which is a sticky, black, and highly viscous liquid or semi-solid that is present in most crude petroleums and in some natural deposits sometimes termed asphaltum. Asphalt (bitumen) pitch is also commercially available from a wide range of sources. Other suitable sources of pitch can include heavy crude oil, heavy petroleum distillates, and tar-like, low volatility Fischer-Tropsch products. As such, the pitch can be or include tall oil pitch, coal tar pitch, heavy crude oil, heavy petroleum distillates, Fischer-Tropsch products, asphalt (bitumen), or any combination thereof.

The fatty acids and rosin acids can be derived from any suitable source. For example, the fatty acids and rosin can be recovered as products from the distillation of crude tall oil. Suitable sources of fatty acids and/or rosins can include distilled tall oil (DTO), tall oil fatty acids (TOFA), rosin acids, or any combination thereof, derived from crude tall oil, such as by the distillation of crude tall oil. In another example, the fatty acids and/or rosins can be provided in the form of crude tall oil. In other words, the fatty acids and/or rosins can be used as present in crude tall oil. In another example, the fatty acids and/or rosins can be or include a mixture of crude tall oil and one or more products derived from crude tall oil, e.g., distilled tall oil and/or tall oil fatty acids.

Distilled tall oil (DTO) is an intermediate fraction produced from the distillation of crude tall oil (CTO) and includes a mixture of various components. For example, distilled tall oil can include a mixture of fatty acids, fatty acid esters, rosin, rosin esters, and minor or trace amounts of neutral materials. The distilled tall oil can have a fatty acids and esters of fatty acids concentration ranging from a low of about 55 wt %, about 60 wt %, or about 65 wt % to a high of about 85 wt %, about 90 wt %, or about 95 wt %. The distilled tall oil can have a rosin acids or rosin concentration ranging from a low of about 5 wt %, about 10 wt %, or about 15 wt % to a high of about 30 wt %, about 35 wt %, or about 40 wt %. The distilled tall oil can have a neutral materials concentration ranging from a low of about 0.1 wt %, about 1 wt %, or about 1.5 wt % to a high of about 2 wt %, about 3.5 wt %, or about 5 wt %.

The distilled tall oil can have an acid value ranging from a low of about 20, about 25, or about 30 to a high of about 40, about 45, or about 50. The distilled tall oil can have a viscosity (centipoise at 85° C.) ranging from a low of about 10 cP, about 20 cP, about 30 cP, or about 40 cP to a high of about 100 cP, about 120 cP, about 135 cP, or about 150 cP. The distilled tall oil can have a density ranging from a low of about 840 g/L, about 860 g/L, or about 880 g/L to a high of about 900 g/L, about 920 g/L, or about 935 g/L. The distilled tall oil can have a saponification number ranging from a low of about 180, about 185, or about 190 to a high of about 200, about 205, or about 210. The distilled tall oil can have an iodine value ranging from a low of about 115, about 117, or about 120 to a high of about 130, about 135, or about 140.

The rosin acids derived from crude tall oil (tall oil rosin) are also an intermediate fraction produced from the distillation of crude tall oil. The tall oil rosin can have a concentration of rosin acids ranging from a low of about 80 wt %, about 85 wt %, or about 90 wt % to a high of about 93 wt %, about 95 wt %, or about 99 wt %. Illustrative rosin acids can include, but are not limited to, abietic acid, dehydroabietic acid, isopimaric acid and pimaric acid. For example, the tall oil rosin can have a concentration of abietic acid ranging from a low of about 35 wt %, about 40 wt %, or about 43 wt % to a high of about 50 wt %, about 55 wt %, or about 60 wt %. The tall oil rosin can have a concentration of dehydroabietic acid ranging from a low of about 10 wt %, about 13 wt %, or about 15 wt % to a high of about 20 wt %, about 23 wt %, or about 25 wt %. The tall oil rosin can have a concentration of isopimaric acid of about 10 wt % or less, about 8 wt % or less, about 5 wt % or less, or about 3 wt % or less. The tall oil rosin can have a concentration of pimaric acid of about 10 wt % or less, about 8 wt % or less, about 5 wt % or less, or about 3 wt % or less. The tall oil rosins can have a fatty acids concentration ranging from a low of about 0.5 wt %, about 1 wt %, or about 2 wt % to a high of about 3 wt %, about 5 wt %, or about 10 wt %. The tall oil rosin can have a concentration of neutral materials ranging from a low of about 0.5 wt %, about 1 wt %, or about 2 wt % to a high of about 3 wt %, about 5 wt %, or about 10 wt %. The tall oil rosin can have a density ranging from a low of about 960 g/L, about 970 g/L, or about 980 g/L to a high of about 1,000 g/L, about 1,010 g/L, or about 1,020 g/L. The tall oil rosin can have an acid value ranging from a low of about 150, about 160, or about 165 to a high of about 170, about 175, or about 180.

Tall oil fatty acids (TOFA) is also an intermediate fraction produced from the distillation of crude tall oil and includes a mixture of various fatty acids, fatty acid esters, and minor amounts of rosin, rosin esters, and neutral materials. The tall oil fatty acids can have an oleic acid ranging from a low of about 30 wt %, about 35 wt %, or about 40 wt % to a high of about 45 wt %, about 50 wt %, or about 55 wt %. The tall oil fatty acids can have a linoleic acid concentration ranging from a low of about 30 wt %, about 35 wt %, or about 40 wt % to a high of about 45 wt %, about 50 wt %, or about 55 wt %. The tall oil fatty acids can have a concentration of stearic acid ranging from a low of about 0.5 wt %, about 1 wt %, or about 1.5 wt % to a high of about 2 wt %, about 3 wt %, or about 5 wt %. The tall oil fatty acids can have a concentration of conjugated linoleic acid ranging from a low of about 0.5 wt %, about 1 wt %, or about 1.5 wt % to a high of about 2 wt %, about 3 wt %, or about 5 wt %. The tall oil fatty acids can have a combined concentration of palmitic acid, linolenic acid, and palmitoleic acid ranging from a low of about 0.5 wt %, about 1 wt %, or about 1.5 wt % to a high of about 2 wt %, about 3 wt %, or about 5 wt %. The tall oil fatty acids can have a concentration of rosins of about 5 wt % or less, about 3 wt % or less, about 2 wt % or less, about 1 wt % or less, or about 0.5 wt % or less. The tall oil fatty acids can have a concentration of neutral materials of about 5 wt % or less, about 3 wt % or less, about 2 wt % or less, 1 about 1 wt % or less, or about 0.5 wt % or less.

The tall oil fatty acids can have an acid value ranging from a low of about 180, about 190, or about 195 to a high of about 200, about 205, or about 210. The tall oil fatty acids can have a density ranging from a low of about 840 g/L, about 860 g/L, or about 880 g/L to a high of about 920 g/L, about 940 g/L, or about 960 g/L. The tall oil fatty acids can have a saponification number ranging from about 190 to about 210. The tall oil fatty acids can have an iodine value ranging from about 120 to about 135.

Suitable products derived from crude tall oil (CTO) are commercially available from a variety of sources including Georgia-Pacific Chemicals LLC. Representative distilled tall oil (DTO), tall oil fatty acids (TOFA), and/or tall oil rosin products can include, but are not limited to, XTOL® 100, XTOL® 101, XTOL® 300, XTOL® 304, XTOL® 520, XTOL® 530, XTOL® 540, XTOL® 542, XTOL® 656, XTOL® 690, XTOL® 692, XTOL® MTO, LYTOR® 100, LYTOR® 105, LYTOR® 105K, LYTOR® 110 and LYTOR® 307.

Processes for producing tall oil pitch, distilled tall oil, tall oil fatty acids, tall oil rosin acids, and other products derived from crude tall oil can be as discussed and described in U.S. Pat. Nos. 3,943,117; 4,075,188; 4,154,725; 4,238,304; 4,308,200; 4,495,095; 4,524,024; 5,132,399; 5,164,480; and, 6,469,125; and U.S. Patent Application Publication Nos. 2005/0268530; and 2010/0025625, which are incorporated by reference herein. It also is understood by those skilled in the art that because crude tall oil, and, as such, tall oil pitch, distilled tall oil, tall oil fatty acids, tall oil rosins, and other crude tall oil derived products are derived from natural sources, the compositions can vary among the various sources.

The one or more base compounds can be or include any alkaline material. Illustrative base compounds can include, but are not limited to, hydroxides, carbonates, ammonia, amines, or any combination thereof. Illustrative hydroxides can include, but are not limited to, sodium hydroxide, potassium hydroxide, ammonium hydroxide (e.g., aqueous ammonia), lithium hydroxide, and cesium hydroxide. Illustrative carbonates can include, but are not limited to, sodium carbonate, potassium carbonate, and ammonium carbonate. Illustrative amines can include, but are not limited to, alkanolamines, polyamines, aromatic amines, and any combination thereof. Illustrative alkanolamines can include, but are not limited to, monoethanolamine (MEA), diethanolamine (DEA), triethanolamine (TEA), or any combination thereof. An alkanolamine is defined as a compound that has both amino and hydroxyl functional groups as illustrated by diethanolamine, triethanolamine, 2-(2-aminoethoxy)ethanol, aminoethyl ethanolamine, aminobutanol and other aminoalkanols. Illustrative aromatic amines can include, but are not limited to, benzyl amine, aniline, ortho toludine, meta toludine, para toludine, n-methyl aniline, N—N'-dimethyl aniline, di- and tri-phenyl amines, 1-naphthylamine, 2-naphthylamine, 4-aminophenol, 3-aminophenol and 2-aminophenol. Illustrative polyamines can include, but are not limited to, diethylenetriamine (DETA), triethylenetetramine (TETA), tetraethylenepentamine (TEPA). Other polyamines can include, for example, 1,3-propanediamine, 1,4-butanediamine, polyamidoamines, and polyethylenimines.

In one or more embodiments, the one or more emulsifiers or emulsifying agents that can be used to prepare the emulsion can include any emulsifier or combination of emulsifiers. Different classes of emulsifiers can include cationic emulsifiers such as alkyltrimethylammonium salts, polyethoxylated tallow amines, anionic emulsifiers such as alkyl sulfates, alkyl benzene sulfonates, alkyl carboxylates, nonionic emulsifiers such as fatty alcohols, ethoxylated alkylphenols, and amphoteric emulsifiers such as amino acids, betaines, or any combination thereof.

In one or more embodiments, the emulsifier can be or include protein-based emulsifiers and/or other natural emulsifiers. Illustrative protein-based emulsifiers can include, but are not limited to, soy-protein based materials, gelatin, phospholipids such as lecithin and casein, and the like. Alkali salts, e.g. sodium and/or ammonium salts of casein, can also be used. An alkali caseinate can be pre-formed or it can be formed in situ when preparing the emulsion, for example by mixing casein with an alkali hydroxide during the preparation of the emulsion. Other natural emulsifiers can include, but are not limited to, Gum Arabic, Guar gum, and starches such as corn starch and potato starch.

Other emulsifiers can include nonylphenol ethoxylates of various ethoxylate chain lengths, alkyl succinate salts, resinous soaps and resinous emulsions such as fatty acid based materials and rosin acid based materials. A suitable nonylphenol ethyoxylate commercially available can be or include Tergitol NP-70 (available from Dow Chemical Company). Suitable emulsifiers can also include fatty acid based materials and rosin acid based materials derived from crude tall oil (CTO), distilled tall oil (DTO), tall oil fatty acids (TOFA), chemically modified tall oil (including products identified as dimer acids, oxidized tall oil, maleated tall oil, oxidized and maleated tall oil and chemically-modified versions thereof), tall oil rosins, chemically modified tall oil rosins, or any combination thereof. Illustrative maleated, oxidized, maleated and oxidized, and/or derivatives thereof can include those compositions discussed and described in U.S. Patent Application Publication Nos. 2008/0179570, 2008/0194795, 2009/0065736, and 2009/0194731. In one or more embodiments, the emulsifier can be or include one or more Maillard reaction products. Illustrative Maillard reaction products can include, but are not limited to, an adduct of an amine reactant and a reducing sugar, a reducing sugar equivalent, or a mixture thereof. Suitable Maillard reaction products can be as discussed and described in U.S. Patent Application Publication No. 2009/0301972. In one or more embodiments, fatty acid based and/or rosin acid based emulsifiers can be partially neutralized.

Other fatty acids and chemically modified fatty acids can include straight-chain or branched, saturated, mono- or poly-unsaturated fatty acid radicals having 8 to 24 carbon atoms, in particular 12 to 22 carbon atoms, or any combination thereof. Representative fatty acids include oleic acid, lauric acid, linoleic acid, linolenic acid, palmitic acid, stearic acid, ricinoleic acid, myristic acid, arachidic acid, behenic acid and mixtures thereof.

Other fatty acids-based products suitable for use as the emulsifier can include fatty acids derived (saponified) from animal or plant derived oils and their derivatives. Through the use of known saponification techniques, a number of animal and/or vegetable oils (triglycerides), such as linseed (flaxseed) oil, castor oil, tung oil, soybean oil, cottonseed oil, olive oil, canola oil, corn oil, sunflower seed oil, peanut oil, coconut oil, safflower oil, palm oil, or any combination thereof, can be used as a source of fatty acid(s) for making an emulsifier.

In one or more embodiments, the amount of the emulsifier or the presence of an emulsifier can depend, at least in part, on the particular emulsifier and/or the particular components of the emulsion to be formed. For example, if the emulsion consists of tall oil pitch, an emulsifier is preferably used to produce the emulsion. In another example, if the emulsion includes crude tall oil, distilled tall oil, tall oil rosins, and/or tall oil fatty acids, an emulsifier can be used or avoided to produce the emulsion. In other words, if crude tall oil and/or one or more products derived from crude tall oil are used as the source for the one or more pitches, fatty acids, and/or rosins, the crude tall oil and/or products derived therefrom can act as emulsifiers. The suitability of any particular emulsifier and an appropriate quantity to use in the emulsification for a particular emulsion composition and/or the particular film forming polymer(s) can be selected following routine testing.

In one or more embodiments, producing an emulsion that contains only pitch, can include the addition of an emulsifier ranging from about 1 wt % to about 100 wt %, based on the weight of the pitch (i.e., an emulsifier to pitch weight ratio of about 0.01:1 to about 1:1). In one or more embodiments, an emulsion composition having one or more fatty acids and/or rosin acids. For example crude tall oil, distilled tall oil, and the like, can be formed without the addition of a separate emulsifier or with the addition of a separate emulsifier, such as casein, ranging from about 1 wt % to about 100 wt % based on the weight of the tall oil pitch in the crude tall oil, distilled tall oil, and the like.

In one or more embodiments, the emulsion can be or include an emulsion of crude tall oil. In one or more embodiments, the emulsion can be or include an emulsion of crude tall oil, tall oil pitch, distilled tall oil (DTO), tall oil fatty acids (TOFA), tall oil rosins, or any combination thereof. For example, the emulsion can include a combination of tall oil pitch and distilled tall oil. In another example, the emulsion can be or include an emulsion of tall oil pitch and tall oil fatty acids and/or tall oil rosins.

In one or more embodiments, the concentration of pitch(es) in the emulsion can range from about 5 wt % to about 80 wt %, based on the combined weight of any pitch(es), fatty acid(s), rosin(s), and base compound(s) in the emulsion. For example, the concentration of the pitch(es) in the emulsion can range from a low of about 10 wt %, about 20 wt %, about 30 wt %, or about 35 wt % to a high of about 50 wt %, about 60 wt %, about 70 wt %, or about 75 wt %, based on the combined weight of any pitch(es), fatty acid(s), rosin(s), and base compound(s) in the emulsion.

In one or more embodiments, the concentration of fatty acid(s) in the emulsion can range from about 1 wt % to about 45 wt %, based on the combined weight of any pitch(es), fatty acid(s), rosin(s), and base compound(s) in the emulsion. For example, the concentration of the fatty acid(s) in the emulsion can range from a low of about 3 wt %, about 5 wt %, about 10 wt %, about 20 wt %, or about 25 wt % to a high of about 30 wt %, about 35 wt %, about 37 wt %, or about 40 wt %, based on the combined weight of any pitch(es), fatty acid(s), rosin(s), and base compound(s) in the emulsion.

In one or more embodiments, the concentration of rosin(s) in the emulsion can range from about 1 wt % to about 40 wt %, based on the combined weight of any pitch(es), fatty acid(s), rosin(s), and base compound(s) in the emulsion. For example, the concentration of the fatty acid(s) in the emulsion can range from a low of about 3 wt %, about 5 wt %, about 15 wt %, or about 20 wt % to a high of about 25 wt %, about 30 wt %, about 35 wt %, or about 40 wt, based on the combined weight of any pitch(es), fatty acid(s), rosin(s), and base compound(s) in the emulsion.

In one or more embodiments, the concentration of the base compound(s) in the emulsion can range from about 0.1 wt % to about 5 wt %, based on the combined weight of any pitch(es), fatty acid(s), rosin(s), and base compound(s) in the emulsion. For example, the concentration of the base compound(s) in the emulsion can range from a low of about 0.5 wt %, about 0.8 wt %, or about 1 wt % to a high of about 2 wt %, about 3 wt %, or about 4 wt %, based on the combined weight of any pitch(es), fatty acid(s), rosin(s), and base compound(s) in the emulsion.

In one or more embodiments, the emulsion can have a concentration of water ranging from about 30 wt % to about 90 wt, based on the combined weight of any pitch(es), fatty acid(s), rosin(s), base compound(s), and water in the emulsion. For example, emulsion can have a concentration of water ranging from a low of about 30 wt %, about 35 wt %, about 40 wt %, or about 45 wt % to a high of about 60 wt %, about 70 wt %, about 80 wt %, or about 90 wt %, based on the combined weight of any pitch(es), fatty acid(s), rosin(s), base compound(s), and water in the emulsion.

The film forming polymer can include any film forming polymer or combination of film forming polymers. Preferably the film forming polymer(s) does not interfere with the stability of the emulsion that includes one or more pitches, fatty acids, rosin acids, or any combination thereof. Suitable film forming polymers can be identified using only routine testing. The film forming polymer(s) can be water soluble. The film forming polymers can be capable of forming a latex.

Suitable film forming polymers can include, but are not limited to, copolymers of styrene and acrylic acid; copolymers of styrene-acrylate; copolymers of styrene and maleic anhydride; copolymers of styrene and maleic acid; copolymers of styrene butadiene; copolymers of styrene isoprene; polyolefins; polyacrylates and other acrylate copolymers; polystyrene; polystyrene copolymers; polyurethanes; polyamides; polyesters including alkyd resins; modified rosin salts; polycarbonates; polyacrylamides; vinyl chloride and/or vinyledene chloride homopolymers and copolymers; polyterpenes; resins based on aldehydes (formaldehyde) with phenolics, melamine, and/or urea; polyimides; polysiloxanes; polyvinylpyrolidone; aliphatic hydrocarbon resins; aromatic hydrocarbon resins; polyvinyl alcohol; polyethylene glycol; polyethylene imines; polyethylene oxides; lignosulfonates; water soluble gums; water soluble starches; microcrystalline waxes; petroleum; hydroxymethyl cellulose; carboxymethylcellulose; rubber and modified rubber latexes; humates; tallow; shellac and gilsonite. The film forming polymers can be derived from natural sources. The film forming polymers can be synthetically produced. As used herein, the terms "acrylic" and "acrylate" are also intended to include alkylacrylics and alkylacrylates, such as methacrylic and methacrylate.

In one or more embodiments, the film forming polymer can include functional groups or segments capable of interacting both with an aqueous phase and with the pitch. As such, in one or more embodiments the film forming polymer can include both hydrophilic and hydrophobic groups or segments. For interacting with an aqueous phase, the film forming polymer can include hydrophilic groups such as carboxyl or hydroxyl groups. For interacting with the pitch, the film forming polymer can include groups or segments that are hydrophobic, such as hydrocarbon groups. Illustrative hydrophilic groups or segments can include, but are not limited to, polymerized maleic anhydride (maleic acid), acrylic acid, methacrylic acid, hydroxyethylacrylic acid, hydroxyethylmethacrylic acid, hydroxymethylacrylate, hydroxyethylacrylate, hydroxyethyl methacrylate, ethylene oxide, hydrolyzed vinylacetate, or any combination thereof. Illustrative hydrophobic groups or segments can include, but are not limited to, polymerized ethylene, propylene, butylene, styrene, halogenated olefins such as tetrafluoroethylene, chlorotrifluoroethylene, acrylates of alcohols having about 1-20 carbon atoms, or any combination thereof. Methods for making such film forming polymers are well known and such materials are widely available commercially.

In one or more embodiments, suitable film forming polymers can have a sufficiently high molecular weight so that at their level of use they can form, in cooperation with the pitch (if present), a film having both a reduced tack and a sufficient integrity to reduce the generation of fugitive dust on the surface of the solids to which the dedusting composition has been applied. In one or more embodiments, the molecular weight of the film forming polymer can range from a low of about 1,000, about 5,000, about 10,000, about 15,000, or about 20,000 to a high of about 100,000, about 200,000, about 300,000, about 400,000, or about 500,000. In one or more embodiments, the molecular weight of the film forming polymer can range from about 10,000 to about 300,000, from about 10,000 to about 200,000, or from about 10,000 to about 180,000.

In at least one specific embodiment, the film forming polymer can be or include styrene maleic anhydride (acid) (SMA). The molecular weight of the SMA copolymer can vary within wide limits. The SMA copolymer can have a weight average molecular weight (Mw) of between about 1,000 and about 500,000. For example, the SMA copolymer can have a Mw ranging from a low of about 1,000, about 5,000, about 10,000, about 15,000, or about 20,000 to a high of about 100,000, about 200,000, about 300,000, about 400,000, or about 500,000. In another example, the Mw of the SMA copolymer can range from a low of about 1,000, about 5,000, or about 10,000 to a high of about 400,000, or about 350,000, or about 300,000, or about 250,000, or about 200,000, or about 175,000, or about 150,000, or about 120,000, or about 100,000, or about 90,000, or about 80,000, or about 70,000, or about 60,000, or about 50,000, or about 40,000, or about 30,000, or about 20,000.

In one or more embodiments, the amount of film forming polymer(s) relative to the emulsion can vary between wide limits. The film forming polymer can be present in the dedusting composition in an amount sufficient to reduce the tack of the emulsion and/or an at least partially dried emulsion. For example, for a dedusting composition that includes an emulsion containing one or more pitches, the dedusting composition can have a concentration of the film forming polymer(s) ranging from a low of about 1 wt %, about 5 wt %, or about 10 wt % to a high of about 30 wt %, about 40 wt %, or about 50 wt % based on the weight of the one or more pitches. In another example, for a dedusting composition that includes an aqueous emulsion containing one or more pitches, the dedusting composition can have a concentration of the film forming polymer(s) ranging from a low of about 1 wt %, about 5 wt %, or about 10 wt % to a high of about 30 wt %, about 40 wt %, or about 50 wt % based on the weight of the one or more pitches. In another example, for a dedusting composition that includes an aqueous emulsion containing one or more pitches, the dedusting composition can have a concentration of the film forming polymer(s) ranging from about 1 wt % to about 50 wt %, from about 5 wt % to about 25 wt %, from about 5 wt % to about 20 wt %, or from about 1 wt % to about 25 wt %, based on the weight of the one or more pitches.

In one or more embodiments, for a dedusting composition that includes an emulsion containing one or more fatty acids, the dedusting composition can have a concentration of the film forming polymer(s) ranging from a low of about 0.5 wt %, about 1 wt %, about 3 wt %, about 5 wt %, or about 10 wt % to a high of about 30 wt %, about 35 wt %, about 40 wt %, about 45 wt % or about 50 wt %, based on the weight of the fatty acids. For example, the dedusting composition can have a concentration of the film forming polymer(s) of from about 2 wt % to about 30 wt %, about 5 wt % to abut 40 wt %, about 25 wt % to about 50 wt %, or about 15 wt % to about 45 wt %, based on the weight of the fatty acids.

In one or more embodiments, for a dedusting composition that includes an emulsion containing one or more rosins, the dedusting composition can have a concentration of the film forming polymer(s) ranging from a low of about 3 wt %, about 5 wt %, about 8 wt %, or about 10 wt % to a high of about 20 wt %, about 23 wt %, about 25 wt %, or about 30 wt %, based on the weight of the rosins. For example, the dedusting composition can have a concentration of the film forming polymer(s) of from about 5 wt % to about 20 wt %, about 15 wt % to about 30 wt %, about 20 wt % to about 30 wt %, about 10 wt % to about 30 wt %, or about 10 wt % to about 25 wt %, based on the weight of the rosins.

In one or more embodiments, for a dedusting composition that includes an emulsion containing one or more fatty acids and one or more rosins, the dedusting composition can have a concentration of the film forming polymer(s) ranging from a low of about 5 wt %, about 8 wt %, or about 10 wt % to a high of about 13 wt %, about 15 wt %, about 18 wt %, or about 20 wt %, based on the combined weight of the fatty acids and the rosins. For example, the dedusting composition can have a concentration of the film forming polymer(s) of from about 8 wt % to about 20 wt %, about 8 wt % to about 15 wt %, about 12 wt % to about 20 wt %, or about 10 wt % to about 18 wt %, based on the combined weight of the fatty acids and the rosins.

In one or more embodiments, for a dedusting composition that includes an emulsion containing one or more pitches and one or more fatty acids and one or more rosins, the dedusting composition can have a concentration of the film forming polymer(s) ranging from a low of about 5 wt %, about 8 wt %, or about 10 wt % to a high of about 13 wt %, about 15 wt %, about 18 wt %, or about 20 wt %, based on the combined weight of the pitches, fatty acids, and rosins. For example, the dedusting composition can have a concentration of the film forming polymer(s) of from about 8 wt % to about 20 wt %, about 8 wt % to about 15 wt %, about 12 wt % to about 20 wt %, or about 10 wt % to about 18 wt %, based on the combined weight of the fatty acids and the rosins.

The composition can also include one or more oils. The one or more oils can be petroleum based or petroleum derived oils, bio-based or bio-derived oils, synthetic-based or synthetically-derived oils, or any combination thereof. In one or more embodiments, the oil can be or include mineral oils, glycols such as ethylene glycol, motor oils, hydraulic oils, soybean oil, rapeseed oil, sunflower oil, corn oil, peanut oil, cotton oil, palm, oil, palm kernel oil, coconut oil, or any combination thereof. Suitable oils can include hydrocarbons that contain from about 10 carbon atoms to about 100 carbon atoms. For example, the number of carbon atoms in the oil can range from a low of about 10, about 15, about 20, about 25 or about 30 to a high of about 40, about 60, about 70, about 80, about 90, or about 100. Motor oils can include those oils conventionally or typically used to lubricate moving components in internal combustion engines, for example.

The one or more oils can have any number of desired properties or combination of properties. For example, the one or more oils can have flash point of greater than about 200° C., greater than about 250° C., greater than about 300° C., greater than about 350° C., greater than about 400° C., greater than about 450° C., greater than about 500° C., greater than about 550° C., or greater than about 600° C. In another example, the one or more oils can have a flash point between about 275° C. and about 600° C., between about 300° C. and about 550° C., between about 350° C. and about 500° C., or between about 400° C. and about 600° C. In one or more embodiments, the flash point of the oil can be greater than a temperature the composition can be subjected to when used to produce a fiberglass product. In another example, the one or more oils can have a flash point ranging from a low of about 200° C., about 225° C., about 250° C., about 275° C., or about 300° C. to a high of about 350° C., about 375° C., about 400° C., about 425° C., about 450° C., about 475° C., about 500° C., about 525° C., or about 550° C.

Considering mineral oil in more detail, the mineral oil can include from about 15 to about 40 carbon atoms. The mineral oil can include paraffinic hydrocarbons, naphthenic hydrocarbons, aromatic hydrocarbons, or any combination thereof. Mineral oil can also be referred to as "Bright Stock" oil.

In one or more embodiments, the amount of oil(s) relative to the emulsion can vary between wide limits. For example, for a composition that includes an emulsion containing one or more pitches, the composition can have a concentration of the oil(s) ranging from a low of about 1 wt %, about 5 wt %, or about 10 wt % to a high of about 30 wt %, about 40 wt %, or about 50 wt % based on the weight of the one or more pitches. In another example, for a composition that includes an emulsion containing one or more pitches, the composition can have a concentration of the oil(s) ranging from about 1 wt % to about 50 wt %, from about 5 wt % to about 25 wt %, from about 5 wt % to about 20 wt %, or from about 1 wt % to about 25 wt %, based on the weight of the one or more pitches.

In one or more embodiments, for a composition that includes an emulsion containing one or more pitches and one or more fatty acids and one or more rosins, the composition can have a concentration of the oil(s) ranging from a low of about 1 wt %, about 5 wt %, or about 10 wt %, or about 20 wt % to a high of about 50 wt %, about 60 wt %, about 70 wt %, about 80 wt %, about 90 wt %, or about 100 wt %, based on the combined weight of the pitches, fatty acids, and rosins. In one or more embodiments, an emulsion containing the one or more pitches and one or more fatty acids and/or one or more rosins, the composition can have a concentration of the oil(s) ranging from a low a low of about 1 wt %, about 5 wt %, or about 10 wt %, or about 20 wt % to a high of about 50 wt %, about 60 wt %, about 70 wt %, about 80 wt %, about 90 wt %, or about 100 wt %, based on the combined weight of the pitches, fatty acids, and rosins.

In one or more embodiments, the dedusting composition can include one or more film forming polymers and the one or more oils can be excluded. In one or more embodiments, the dedusting composition can include one or more oils and the one or more film forming polymers can be excluded. In one or more embodiments, the dedusting composition can include both the one or more film forming polymers and the one or more oils. If both the film forming polymer(s) and the oil(s) are present in the dedusting composition, the film forming polymer(s) and the oil(s) can be added to the dedusting composition in any desired amount with respect to one another. For example, the weight ratio of the film forming polymer(s) to the oil(s) can range from about 0.01:1 to about 1:0.01.

The dedusting composition can be prepared by blending, mixing, or otherwise combining the components thereof in any desired order or sequence. The mixing procedure can be carried out at ambient temperature or at a temperature greater than ambient temperature, for example about 50° C. For example, all the components of the dedusting composition can be simultaneously mixed, blended, or otherwise combined with one another. In another example, the components of the dedusting composition can be added one after another (in any order or sequence), with mixing or blending occurring between and/or during the addition of each component. In another example, some of the components can be mixed or blended together and then other components can be added, e.g. one after another or at the same time, and the mixture can be further mixed to form the binder composition. For example, the emulsion can be prepared by first preparing an aqueous phase and then mixing the so-prepared aqueous phase with the one or more pitches, one or more fatty acids, one or more rosin acids, or any combination thereof. If added, the base compound(s) can be added to the aqueous phase, before, with, or after the one or more pitches, one or more fatty acids, and/or one or more rosin acids. The film forming polymer and/or the oil can then be mixed with the aqueous phase, with the one or more pitches, one or more fatty acids and/or one or more rosins, or with the emulsion, after the emulsion has been formed. If the emulsifier is used, the emulsifier can be added at any point during the preparation of the emulsion, e.g. before, during, or after the addition of the one or more pitches, one or more fatty acids, and/or one or more rosin acids.

In at least one specific embodiment, the emulsion can be prepared by mixing water with the base compound(s), e.g., caustic (NaOH), the one or more pitches, fatty acids, and/or rosins, and the optional emulsifier(s) together with sufficient agitation to produce the emulsion. The one or more film forming polymers and/or oils can then be added to the emulsion. In one or more embodiments, the emulsifier (if used), the film forming polymer and/or the oil can be added, along with the base, as part of the aqueous phase. In this example, the aqueous phase can be prepared by mixing an initial, minor portion of the water to be used in preparing the emulsion with the emulsifier (if used), e.g., an alkali caseinate such as sodium or ammonium caseinate, with the film forming polymer and/or the oil. For example, about 10% to about 20% of the emulsification water can be used to form an initial mixture containing the emulsifier (if used), the film forming polymer and/or the oil. Then, the additional water for forming the emulsion can be added before the aqueous phase is mixed with the one or more pitches, fatty acids, and/or rosins. Alternatively, the aqueous phase can be prepared using the full amount of water to be used in preparing the emulsion and adding the emulsifier and/or film forming polymer to the water to form the aqueous phase. The one or more pitches, fatty acids, and/or rosins can then be added to the aqueous phase to produce the emulsion.

In one or more embodiments, when using a water dispersible (e.g., water soluble) film forming polymer, such as a solubilized styrene-maleic anhydride copolymer, and a fatty acid-based or rosin acid-based emulsifier, such as a tall oil-based emulsifier, an aqueous phase containing the base and film forming polymer can be prepared. Separately, a mixture of the emulsifier (if used) and the one or more pitches, fatty acids, and/or rosins can be prepared. The mixture of emulsifier (if used) and the one or more pitches, fatty acids, and/or rosins can then be added to the aqueous mixture of base and film forming polymer to form the emulsion. Alternatively, the aqueous mixture of base and film forming polymer to form the emulsion can be added to the mixture of emulsifier (if used) and the one or more pitches, fatty acids, and/or rosins.

In preparing the emulsion, the pH can be adjusted to a pH of about 7.5 or more, about 8 or more, about 8.5 or more, about 9 or more, about 9.5 or more, about 10 or more, about 10.5 or more, about 11 or more, or about 11.5 or more. For example, the pH of the emulsion can range from about 8 to about 12, from about 8.5 to about 12, from about 9 to about 12, from about 9.5 to about 12, or from about 10 to about 12. The pH of the emulsion can be adjusted using a wide variety of alkaline materials, including, but not limited to, alkali metal hydroxides and carbonates. The pH of the emulsion can be adjusted by adding the alkaline material either before or after mixing the water with the one or more pitches, fatty acids, and/or rosins and, if present, the emulsifier to form the emulsion.

The emulsion can have any desired solids concentration. The solids can be or include the one or more pitches, fatty acids, rosins, film forming polymer, and/or emulsifier. For example, the dedusting composition can have a solids concentration ranging from about 10 wt % to about 60 wt %. In another example, the dedusting composition can have a solids concentration ranging from a low of about 10 wt %, about 20 wt %, or about 30 wt % to a high of about 40 wt %, about 50 wt %, or about 60 wt %, based on the weight of the dedusting composition. In another example, the dedusting composition can have a solids concentration of about 25 wt % to about 60 wt %, or about 30 wt % to about 55 wt %, or about 35 wt % to about 45 wt %.

The solids in the dedusting composition can have any desired size. For example, the solids in the dedusting composition can have an average size ranging from about 0.1 μm to about 20 μm. In another example, the size of the solids in the dedusting composition can be less than about 10 μm, less than about 8 μm, less than about 5 μm, less than about 4 μm, less than about 3 μm, less than about 2 μm, less than about 1 μm, or less than about 0.5 μm. In another example, the size of the solids in the dedusting composition can range from about 0.5 μm to about 3.5 μm, from about 1 μm to about 3 μm, or from about 0.5 μm to about 3 μm.

In one or more embodiments, the concentration of solids in the dedusting composition can be reduced by adding additional water. For example, it can be desirable to ship the dedusting composition at a significantly higher content of solids than is needed for any particular end use application. As such, additional water can be added at the site where the emulsion is to be used.

The dedusting composition can be significantly diluted before use, yet the dedusting composition can remain stable for use in typical commercial applications. For example, the dedusting concentration can be diluted with water at a ratio of about 1:0.5, about 1:1, about 1:2.5, about 1:3, about 1:3.5, about 1:4, or about 1:5. The dedusting composition (before or after dilution) can remain stable for several weeks or even months. For example, the dedusting composition (before or after dilution) can remain stable for a month or more, two months or more, three months or more, four months or more, five months or more, or six months or more.

The dedusting composition can include any number of other additives. For example, the composition can also include a finely divided filler material. Illustrative filler materials can include, but are not limited to, calcium salt such as calcium carbonate gypsum, lime, silica, magnesium oxide, magnesium carbonate, dolomite, vermiculite, talc, nut shell flours, nano-clays, bentonite clay, kaolin clay, and the like, or any combination thereof. The presence of the filler material can also reduce the tackiness of a film produced by the dedusting composition upon drying or at least partially drying.

One of the advantages of the dedusting composition is that a stable emulsion can be prepared at a solids concentration at which the emulsion can be easily pumped for storage and transportation, often to remote locations, at which time the emulsion then can be further diluted and/or concentrated prior to application.

When sprayed, coated, or otherwise applied to a substrate, the dedusting composition can form a film or layer. The film or layer formed by the dedusting composition after applying to a substrate can have any desired thickness. For example, the film or layer can have a thickness ranging from about 1 μm to about 1,000 μm, or about 10 μm to about 500 μm, or about 20 μm to about 250 μm. In another example, the film or layer can have a thickness ranging from a low of about 10 μm, about 25 μm, about 50 μm, about 75 μm, or about 100 μm to a high of about 150 μm, about 175 μm, about 200 μm, about 225 μm, about 250 μm, about 300 μm, about 400 μm, or about 500 μm.

When sprayed, coated, or otherwise applied to a substrate, the dedusting composition can form a film or layer. The film or layer formed by the dedusting composition after applying to a substrate can be applied in any desired amount. For example, the dedusting composition can be applied at a rate of about 0.1 L/m$^2$, about 1 L/m$^2$, about 1.5 L/m$^2$, or about 2 L/m$^2$ to a high of about 3 L/m$^2$, about 4 L/m$^2$, about 5 L/m$^2$, about 10 L/m$^2$, about 15 L/m$^2$, about 20 L/m$^2$, about 30 L/m$^2$, about 40 L/m$^2$, or about 50 L/m$^2$. In another example, the dedusting composition can be applied to a surface, substrate, or other material in an amount of from about 0.1 L/m$^2$ to about 5 L/m$^2$, from about 1 L/m$^2$ to about 4 L/m$^2$, from about 2 L/m$^2$ to about 10 L/m$^2$, or from about 1 L/m$^2$, to about 15 L/m$^2$.

In one or more embodiments, the composition or dedusting composition can at least partially dry to a film that a tack tester falls over in less than about 120 seconds, less than about 110 seconds, less than about 100 seconds, less than about 90 seconds, less than about 80 seconds, less than about 70 seconds, less than about 60 seconds, less than about 45 seconds, less than about 30 seconds, less than about 15 seconds, less than about 5 seconds, or less than about 1, once a 300 gram weight is removed after being place for 5 seconds on the base of the tack tester, according to ASTM 1640-03. In one or more embodiments, the composition or dedusting composition can at dry to a film that a tack tester falls over in less than about 120 seconds, less than about 110 seconds, less than about 100 seconds, less than about 90 seconds, less than about 80 seconds, less than about 70 seconds, less than about 60 seconds, less than about 45 seconds, less than about 30 seconds, less than about 15 seconds, less than about 5 seconds, or less than about 1, once a 300 gram weight is removed after being place for 5 seconds on the base of the tack tester, according to ASTM 1640-03. In one or more embodiments, the composition or dedusting composition can form an at least partially dried film that is tack free according to ASTM 1640-03. In one or more embodiments, the composition or dedusting composition can form a dried film that is tack free according to ASTM 1640-03.

Various equipment can be used for applying the dedusting compositions, to roads, open-top railcars, or other substrates that could potentially be a source of fugitive dust. Illustrative equipment that can be used to apply the dedusting composition to open-top railcars can be as discussed and described in U.S. Pat. Nos. 3,961,752; 5,350,596; 5,352,297 and 5,441,566. These and other devices or equipment for spraying, coating, or otherwise depositing a layer of the dedusting composition onto the surface of material from which the development of fugitive dust is to be reduced can be used. By spraying an appropriate amount of the dedusting composition on the dust-forming material, a film or layer forms that resists the effects of wind and other factors that contribute to the formation of fugitive dust. For example, in open-top railcars containing coal the dedusting composition can be applied in an amount ranging from about 38 L (10 gallons) to about 189 L (50 gallons) or about 38 L (10 gallons) to about 114 L (30 gallons) per 93 m$^2$ (1,000 ft$^2$) of coal surface area. The dedusting composition can be diluted, used as produced, or concentrated. The dedusting composition can have a solids concentration ranging from about 2 wt % to about 10 wt %, from about 2 wt % to about 40 wt %, or from about 5 wt % to about 45 wt %, for example. Higher or lower application rates and/or solids concentration amounts can be used.

In addition to being useful for treating open-top railcars transporting coal, the pitch emulsions of some embodiments the present invention also are potentially useful in any application where fugitive dust may develop and thus there is a desire to reduce such dust formation. Other applications thus include the transportation of other bulk solids by rail cars, the transport of coal and other bulk solids by conveyor belts, such as in an industrial setting, coal storage areas and rural roads, including logging and mining roads. Examples of other bulk solids include fertilizers, minerals, and grains. Dust suppression in underground mining operations is another suitable application.

EXAMPLES

To provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

Preparation of a Tall Oil Pitch Emulsion

A pitch emulsion for suppressing fugitive dust formation was made by blending two components, identified as component A and component B.

Component A was an emulsion of pitch prepared using distilled tall oil (DTO) as the emulsifier. The component A pitch emulsion was manufactured using a Ross bench-top mill (Charles Ross & Son Company). 1200 g of water was heated to 60° C. 16 g of a 50 wt % aqueous NaOH caustic solution was added to the water. The water and caustic mixture was loaded into a stainless steel beaker and the solution was stirred using the Ross bench-top mill. A mixture of tall oil pitch (GP XTOL® Tall Oil Pitch) and distilled tall oil (DTO) (GP XTOL® 520) was separately prepared by mixing 600 g of the tall oil pitch at 60° C. with 200 g of the DTO, which was at 60° C. The pitch and DTO mixture was then added to the stirred water and caustic mixture over approximately 1 minute. No additional heating was supplied during the addition of the pitch and DTO mixture to the water and caustic mixture. The pitch was emulsified upon contact with the aqueous phase, as evidenced by a light tan homogeneous appearance of the product. The emulsion was removed from the Ross bench-top mill after the completion of the raw material addition and was allowed to cool to room temperature.

Component B was a styrene-maleic anhydride solution. 41.2 g of water, 0.04 grams of a defoamer (Taylor TA-103H Antifoam, a commercial silicone defoarmer), 2.4 g of styrene-maleic anhydride copolymer (ENTEL 2612 SMA, manufactured by Ineos ABS), 9.6 g of an additional styrene-maleic anhydride copolymer (XIRAN SZ 26120 SMA, manufactured by Polyscope), 4.4 g of a 28 wt % aqua ammonia solution, and 1.1 g of a 50 wt % aqueous caustic solution were added to a stainless steel reactor. The contents of the reactor were heated to 90° C. and an additional 40.0 grams of water were added. The mixture was further heated to 105° C. and maintained at 105° C. for 2.5 hours to solubilize the SMA. The solution was then cooled to 40° C. and additional defoamer (0.004 g) was added and the solution was cooled to room temperature. The styrene-maleic anhydride solution (component B) contained about 13% by weight solids in water.

The pitch emulsion was made by mixing at room temperature 100 grams of component A and 30.8 grams of component B.

Example II

Preparation of a Tall Oil Pitch Emulsion

This example describes another procedure for preparing a pitch emulsion for suppressing dust (for dust mitigation) based on substantially the same composition as described in Example I.

682.8 grams of water, 352.8 grams of a styrene-maleic anhydride solution (SMA) (described as component B in Example I), and 9.2 grams of a 50 wt % aqueous caustic solution were added into a stainless steel beaker and the solution was stirred using a Ross bench-top mill.

A mixture of tall oil pitch (GP XTOL® Tall Oil Pitch) and distilled tall oil (DTO) (GP XTOL® 520) was separately prepared by mixing 341.4 grams of pitch at 60° C. with 113.9 g of DTO also at 60° C. The pitch and distilled tall oil mixture was then added to the mixture of water, SMA and caustic solution over approximately 1 minute. No additional heating was supplied during the addition of the pitch and distilled tall oil mixture to the mixture of water, SMA, and caustic solution. The pitch was emulsified upon contact with the aqueous phase, as evidenced by the light tan homogeneous appearance of the product. The emulsion was removed from the mill after the completion of the raw material addition and was allowed to cool to room temperature.

Example III

Tack Testing of a Tall Oil Pitch Emulsion

Samples of the pitch emulsions for suppressing dust of Examples I, II and a comparative example (CE 1) were diluted with water (1 g of sample to 4 g water), and the resulting diluted emulsions were applied to Q panels (Q-Lab Corporation). The comparative example CE 1 was an emulsion prepared using tall oil pitch, water, and an emulsifier. The emulsifier was Tergetol, which is a nonylphenol ethoxylate emulsifier. The comparative example (CE 1) did not include a film forming polymer. In each case an 8 mil (essentially 0.2 mm) thick film was made using a wet film applicator. The films were allowed to dry at 26° C. for 4 hours, and were then tested with a tack tester. The procedure and tack tester according to ASTM 1640-03 were followed. A 300 g weight was placed on the base of the tack tester for 5 seconds and then removed. The film was considered to be tack-free if the tack tester fell over as soon as the weight was removed. The films made with the emulsions of Examples 1 and 2 were both tack free, i.e. the tack tester fell over as soon as the weight was removed from the base of the tack tester. In contrast, the film made with the commercial control was tacky, as the tester remained adhered to the surface for over 2 minutes.

Example IV

Dry-To-Touch Testing of a Tall Oil Pitch Emulsion

A sample of the pitch emulsion prepared in Example I was applied to a Q panel (Q-Lab Corporation), and an 8 mil (essentially 0.2 mm) thick film was made using a wet film applicator. The film was allowed to dry at 26° C. for 2.5 hours, and was then tested by contacting the film with a gloved finger. The film dried in a non-tacky manner, such that the gloved finger could be lifted from the surface of the film on the Q panel without leaving an imprint of the glove or feeling resistance as the finger was lifted. The procedure according to ASTM 1640-03, section 7.5, was followed.

The Q panel after drying was treated with a drop of water which spread to cover an area of approximately the size of a dime. The film underneath the water droplet did not appear to be affected by the water. In contrast, similar films made with pitch emulsions not incorporating the film forming polymer component tended to dissolve into the water droplet over time, leaving behind an exposed substrate surface.

As noted, using this test, the tackiness of pitch emulsions were compared. Those of the present invention show a tack-free performance, while unmodified emulsions were tacky. In some embodiments, the thickness of the test film should be essentially the thickness of the film of the emulsion as the emulsion is to be applied in the particular application. In some applications, such as for allaying fugitive dust formation in open top railcars, the pitch emulsion can be tested at a film thickness of 8 mils.

In one or more embodiments, the composition can dry to a film that is tack-free (tack tester falls over immediately once a 300 gram weight is removed after being placed for 5 seconds on the base of the tack tester (ASTM 1640-03)). In one or more embodiments, the composition can dry to a film that a tack tester falls over in less than about 120 seconds, less than about 110 seconds, less than about 100 seconds, less than about 90 seconds, less than about 80 seconds, less than about 70 seconds, less than about 60 seconds, less than about 45 seconds, less than about 30 seconds, less than about 15 seconds, less than about 5 seconds, or less than about 1 second, once a 300 gram weight is removed after being place for 5 seconds on the base of the tack tester, according to ASTM 1640-03.

Example V

Another test was performed in order to evaluate the effect adding mineral oil and/or SMA copolymer to a composition that contained a binder and a dedusting agent had on the tack of a film made from the composition. Three comparative examples (CE 2-4) and seven inventive examples (EX. 1-7) were prepared. For all examples, a premix was prepared by mixing a phenol-formaldehyde polymer with a 50 wt % urea solution. The premix had a 35 wt % concentration of the urea solution. The premix was allowed to pre-react overnight for about 18 hours at room temperature. Ammonium sulfate (7.6 wt %) was added to the premix as a catalyst and ammonium hydroxide (0.8 wt %) was added to adjust the pH to about 8.8. The premix was then diluted with water to form a premix having a concentration of about 10 wt % solids.

Mineral oil, a dedusting agent, styrene maleic anhydride, or a combination thereof, were added to the premixes. The mineral oil was an emulsion containing 7.5 g polyethyleneglycol (PEG 400), 50 g mineral oil, and 45 g of deionized water. The emulsion was mixed for about five minutes prior to use. The dedusting agent was a 50% emulsion containing 3 parts tall oil pitch and 1 part distilled tall oil. The SMA was a 13% solution of styrene maleic anhydride in water. The specific blends prepared for the examples are shown in Table 1 below.

TABLE 1

| Ex. No. | Premix, 10 wt % solids | Mineral Oil | Dedusting Agent | SMA | Order of Tack |
|---|---|---|---|---|---|
| CE 2 | 10.00 | | | | 9 |
| CE 3 | 9.00 | 1.00 | | | 1 |
| CE 4 | 9.50 | 0.50 | | | 2 |
| 1 | 9.00 | | 1.00 | | 10 |
| 2 | 9.00 | | 1.00 | 1.0 | 4 |
| 3 | 9.50 | | 0.50 | | 8 |
| 4 | 9.50 | | 0.50 | 0.5 | 3 |
| 5 | 9.50 | 0.50 | 0.50 | | 5 |
| 6 | 9.75 | 0.25 | 0.25 | | 7 |
| 7 | 9.67 | 0.33 | 0.33 | | 6 |

Draw down films were made with all the blends shown in Table 1 using an 8 mm draw down square and a 2.5 g sample. The films were allowed to dry in an oven for about 10 minutes at 205° C. The level of tack was tested by contacting the film with a gloved finger. According to the tackiness or level of adhesion between the gloved finger and the film, the films were ranked in order of tackiness, with 1 corresponding to the least tack and 10 corresponding to the most tack. The testing procedure according to ASTM 1640-03, section 7.5, was followed.

The two compositions containing the premix and the mineral oil (CE3 and CE4) had the lowest tack of all the samples evaluated and were ranked 1 and 2, respectively. As the level of mineral oil decreased the tack increased. The addition of the dedusting agent to the premix produced a sample having the highest level of tack (EX. 1) Decreasing the amount of the dedusting agent reduced the level of tack, as shown in EX. 3.

The addition of the SMA to the binder having both the premix and the dedusting agent produced samples having a reduced level of tack (EX. 2 and 4). For example, EX. 1 contained the premix and the dedusting agent and showed a higher tack than EX. 2, which contained the same amount of premix and dedusting agent as EX. 1, but further included SMA.

Embodiments of the present disclosure further relate to any one or more of the following paragraphs:

1. A composition for reducing the formation of dust, comprising: an emulsion comprising one or more pitches, one or more fatty acids, one or more rosins, or any combination thereof and one or more film forming polymers, one or more oils, or a combination thereof.

2. A method for reducing the formation of dust, comprising: applying the composition of claim 1 to a dust forming material in an amount sufficient to reduce the formation of dust.

3. A method for making the composition of claim 1, comprising: emulsifying the one or more pitches, the one or more fatty acids, the one or more rosins, or any combination thereof to produce the emulsion; and combining the emulsion with the one or more film forming polymers, the one or more oils, or both.

4. The composition according to any one of paragraphs 1 to 3, wherein the one or more pitches is derived from bio-based material, petroleum based material, or a combination thereof.

5. The composition according to any one of paragraphs 1 to 4, wherein the one or more pitches comprises tall oil pitch.

6. The composition according to any one of paragraphs 1 to 5, wherein at least a portion of the one or more pitches, the one or more fatty acids, and the one or more rosins are provided in the form of crude tall oil.

7. The composition according to any one of paragraphs 1 to 5, wherein at least a portion of the one or more pitches, the one or more fatty acids, and the one or more rosins are derived from crude tall oil.

8. The composition according to any one of paragraphs 1 to 7, wherein the film forming polymer comprises a copolymer of styrene and acrylic acid; a copolymer of styrene and acrylate; a copolymer of styrene and maleic anhydride; a copolymer of styrene and maleic acid; a copolymer of styrene butadiene; a copolymer of styrene isoprene; polyolefins; polyacrylates; acrylate copolymers; polystyrene; polystyrene copolymers; polyurethanes; polyamides; polyesters; modified rosin salts; polycarbonates; polyacrylamides; vinyl chloride polymers; vinyl chloride copolymers; vinyledene chloride polymers; vinyledene chloride copolymers; polyterpenes; phenol-formaldehyde resins; melamine-formaldehyde resins; urea-formaldehyde resins; polyimides; polysiloxanes; polyvinylpyrolidone; aliphatic hydrocarbon resins; aromatic hydrocarbon resins; polyvinyl alcohols; polyethylene glycols; polyethelene imines; polyethylene oxides; lignosulfonates; water soluble gums; water soluble starches; microcrystalline waxes; petroleum; hydroxymethyl cellulose; carboxymethylcellulose; rubber; modified rubber latexes; humates; tallow; shellac; gilsonite, or any combination thereof.

9. The composition according to any one of paragraphs 1 to 8, wherein the emulsion further comprises one or more protein emulsifiers, one or more phospholipids, one or more non-ionic surfactant emulsifiers, anionic surfactant emulsifiers, or any combination thereof.

10. The composition according to any one of paragraphs 1 to 9, wherein at least a portion of the one or more fatty acids, the one or more rosin acids, or both are provided from crude tall oil, distilled tall oil, tall oil fatty acids, dimer acids, oxidized tall oil, maleated tall oil, oxidized and maleated tall oil, or any combination thereof.

11. The composition according to any one of paragraphs 1 to 10, wherein the film forming polymer is selected from the group consisting of: a copolymer of styrene and acrylic acid; a copolymer of styrene and acrylate; a copolymer of styrene and maleic anhydride; a copolymer of styrene and maleic acid, a copolymer of styrene isoprene, and a copolymer of styrene butadiene.

12. The composition according to any one of paragraphs 1 to 11, wherein the one or more oils comprise mineral oil.

13. The composition according to any one of paragraphs 1 to 12, wherein the one or more oils comprise about 15 to about 40 carbon atoms.

14. The composition according to any one of paragraphs 1 to 13, wherein the combined weight of the one or more pitches, one or more fatty acids, and one or more rosins in the emulsion ranges from about 10 wt % to about 60 wt %, based on the total weight of the emulsion.

15. The composition according to any one of paragraphs 1 to 14, wherein the emulsion contains from about 30 wt % to about 90 wt % water, based on the total weight of the emulsion.

16. The composition according to any one of paragraphs 1 to 15, wherein the composition has a solids concentration ranging from about 25 wt % to about 60 wt %, based on the combined weight of the emulsion, the one or more film forming polymers, and the one or more oils.

17. The composition according to any one of paragraphs 1 to 16, wherein the composition forms a film when applied to a substrate and at least partially dried.

18. The composition according to any one of paragraphs 1 to 17, wherein the composition forms a film when applied to a substrate and at least partially dried, and wherein the film is tack-free.

19. The composition according to any one of paragraphs 1 to 18, wherein the composition is applied to an exposed surface comprising particulates, and wherein the exposed surface is disposed within a railcar.

20. The composition according to any one of paragraphs 1 to 19, wherein the composition forms a film when applied to a substrate, and wherein the film has a thickness ranging from about 1 µm to about 1,000 µm.

21. The composition of paragraph 19, wherein the particulates comprise coal.

22. The composition according to any one of paragraphs 1 to 21, wherein the emulsion has a pH of about 8 to about 12.

23. The composition according to any one of paragraphs 1 to 22, wherein the film forming polymer comprises a copolymer comprising one or more vinyl aromatic derived units and at least one of maleic anhydride and maleic acid.

24. The composition according to any one of paragraphs 1 to 23, wherein the film forming polymer is water dispersible.

25. The composition according to any one of paragraphs 1 to 24, wherein the film forming polymer comprises a water solubilized styrene-maleic anhydride copolymer.

26. The composition according to any one of paragraphs 1 to 25, wherein the one or more pitches are derived from bio-based material, petroleum based material, or a combination thereof.

27. The composition according to any one of paragraphs 1 to 26, wherein at least a portion of the one or more pitches, the one or more fatty acids, and the one or more rosins are provided in the form of crude tall oil, are derived from crude oil, or a combination thereof.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A method for reducing the formation of dust, comprising:

applying a composition to a dust forming material in an amount sufficient to reduce the formation of dust, wherein the composition comprises:
   an emulsion comprising one or more pitches, one or more fatty acids, one or more rosins, or any combination thereof; and
   one or more film forming polymers comprising a copolymer of styrene and maleic anhydride, a copolymer of styrene and maleic acid, or a combination thereof.

2. The method of claim 1, wherein at least a portion of the one or more pitches, the one or more fatty acids, and the one or more rosins are provided in the form of crude tall oil, are derived from crude oil, or a combination thereof.

3. The method of claim 1, wherein the composition is applied to an exposed surface comprising particulates, and wherein the exposed surface is disposed within a railcar.

4. A method for making a composition, comprising:
   emulsifying one or more pitches, one or more fatty acids, one or more rosins, or any combination thereof to produce an emulsion; and
   combining the emulsion with one or more film forming polymers comprising a copolymer of styrene and maleic anhydride, a copolymer of styrene and maleic acid or both to produce the composition.

5. The method of claim 4, wherein at least a portion of the one or more pitches, the one or more fatty acids, and the one or more rosins are provided in the form of crude tall oil, are derived from crude oil, or a combination thereof.

6. The method of claim 4, wherein the film forming polymer further comprises a copolymer of styrene and acrylic acid; a copolymer of styrene and acrylate; a copolymer of styrene butadiene; a copolymer of styrene isoprene; polyolefins; polyacrylates; acrylate copolymers; polystyrene; polystyrene copolymers; polyurethanes; polyamides; polyesters; modified rosin salts; polycarbonates; polyacrylamides; vinyl chloride polymers; vinyl chloride copolymers; vinyledene chloride polymers; vinyledene chloride copolymers; polyterpenes; phenol-formaldehyde resins; melamine-formaldehyde resins; urea-formaldehyde resins; polyimides; polysiloxanes; polyvinylpyrolidone; aliphatic hydrocarbon resins; aromatic hydrocarbon resins; polyvinyl alcohols; polyethylene glycols; polyethelene imines; polyethylene oxides; lignosulfonates; water soluble gums; water soluble starches; microcrystalline waxes; petroleum; hydroxymethyl cellulose; carboxymethylcellulose; rubber; modified rubber latexes; humates; tallow; shellac; gilsonite, or any combination thereof.

7. The method of claim 1, wherein the emulsion further comprises water in an amount of from about 30 wt % to about 90 wt %, based on the combined weight of the one or more pitches, one or more fatty acids, one or more rosin acids, and water in the emulsion, wherein the one or more pitches is present and comprises tall oil pitch, and wherein the one or more fatty acids and the one or more rosin acids are present and comprise crude tall oil, distilled tall oil, tall oil fatty acids, tall oil rosins, chemically modified tall oil, or any combination thereof.

8. The method of claim 1, wherein the one or more pitches is present in an amount from about 20 wt % to about 80 wt %, based on the combined weight of the one or more pitches, one or more fatty acids, and one or more rosin acids, and wherein the one or more film forming polymers is present in an amount from about 1 wt % to about 20 wt % based on the combined weight of the one or more pitches, one or more fatty acids, and one or more rosin acids.

9. The method of claim 1, wherein the one or more pitches is present, and wherein the one or more film forming polymers is present in an amount from about 5 wt % to about 30 wt %, based on the weight of the one or more pitches.

10. The method of claim 1, wherein the emulsion further comprises one or more protein emulsifiers, one or more phospholipids, one or more non-ionic surfactant emulsifiers, anionic surfactant emulsifiers, or any combination thereof.

11. The method of claim 1, wherein the composition further comprises one or more mineral oils.

12. The method of claim 1, further comprising at least partially drying the composition to form a film on the dust forming material.

13. The method of claim 12, wherein the film is tack-free, as measured according to ASTM D-1640-03.

14. The method of claim 1, wherein the emulsion further comprises water in an amount from about 30 wt % to about 90 wt %, based on the total weight of the emulsion.

15. The method of claim 1, wherein the emulsion further comprises one or more base compounds, wherein the one or more pitches is present and comprises a tall oil pitch having a fatty acids and esters of fatty acids concentration from about 5 wt % to about 20 wt %, a rosin acids and esters of rosin acids concentration from about 5 wt % to about 30 wt %, and a neutral materials concentration from about 40 wt % to about 90 wt %, and wherein the tall oil pitch is present in an amount from about 10 wt % to about 80 wt %, based on the combined weight of the one or more pitches, one or more fatty acids, one or more rosin acids, and one or more base compounds.

16. The method of claim 1, further comprising at least partially drying the composition to form a film on the dust forming material such that a tack tester located on a surface of the film falls over in less than about 60 seconds when a 300 gram weight is removed after being placed for 5 seconds on a base of the tack tester, as measured according to ASTM 1640-03.

17. The method of claim 4, wherein the emulsion further comprises one or more base compounds, wherein the one or more pitches comprises tall oil pitch, and wherein the one or more pitches is present in an amount from about 35 wt % to about 80 wt %, based on the combined weight of the one or more pitches, one or more fatty acids, one or more rosin acids, and one or more base compounds.

18. The method of claim 4, wherein the one or more film forming further comprises a copolymer of styrene and acrylic acid; a copolymer of styrene and acrylate; a copolymer of styrene butadiene; a copolymer of styrene isoprene; polyacrylates; acrylate copolymers; polystyrene; polystyrene copolymers; polyurethanes; polyamides; polyesters; modified rosin salts; polycarbonates; polyacrylamides; vinyl chloride polymers; vinyl chloride copolymers; vinyledene chloride polymers; vinyledene chloride copolymers; polyterpenes; phenol-formaldehyde resins; melamine-formaldehyde resins; urea-formaldehyde resins; polyimides; polysiloxanes; polyvinylpyrolidone; polyvinyl alcohols; polyethylene glycols; polyethelene imines; polyethylene oxides; lignosulfonates; water soluble gums; water soluble starches; hydroxymethyl cellulose; carboxymethylcellulose; rubber; modified rubber latexes; humates; tallow; shellac; gilsonite, or any combination thereof.

19. The method of claim 4, wherein the emulsion further comprises one or more base compounds and water, wherein the one or more pitches is present and comprises a tall oil pitch having a fatty acids and esters of fatty acids concentration from about 5 wt % to about 20 wt %, a rosin acids and esters of rosin acids concentration from about 5 wt % to about 30 wt %, and a neutral materials concentration from about 40 wt % to about 90 wt %, wherein the tall oil pitch is present in an amount from about 35 wt % to about 80 wt %, based on the combined weight of the one or more pitches, one or more fatty acids, one or more rosin acids, and one or more base compounds, and wherein the water is present in an amount from about 30 wt % to about 90 wt %, based on the total weight of the emulsion.

20. The method of claim 4, wherein the composition forms a tack-free film, as measured according to ASTM D-1640-03.

* * * * *

UNITED STATES PATENT AND TRADEMARK OFFICE
CERTIFICATE OF CORRECTION

| | | |
|---|---|---|
| PATENT NO. | : 8,580,139 B2 | Page 1 of 1 |
| APPLICATION NO. | : 12/874991 | |
| DATED | : November 12, 2013 | |
| INVENTOR(S) | : Swift et al. | |

It is certified that error appears in the above-identified patent and that said Letters Patent is hereby corrected as shown below:

On the Title Page, Item (74) "Ram W. Sabris" should be corrected to read -- Ram W. Sabnis Signed and Sealed this
Eighth Day of July, 2014

Michelle K. Lee
*Deputy Director of the United States Patent and Trademark Office*